(12) United States Patent
Vignet

(10) Patent No.: US 7,712,054 B2
(45) Date of Patent: May 4, 2010

(54) POPULATING A TABLE IN A BUSINESS APPLICATION

(75) Inventor: Peter Vignet, San Francisco, CA (US)

(73) Assignee: SAP AG, Walldorf (DE)

( * ) Notice: Subject to any disclaimer, the term of this patent is extended or adjusted under 35 U.S.C. 154(b) by 1070 days.

(21) Appl. No.: 11/250,767

(22) Filed: Oct. 14, 2005

(65) Prior Publication Data

US 2007/0089050 A1 Apr. 19, 2007

(51) Int. Cl.
G06F 3/00 (2006.01)
G06F 17/30 (2006.01)
G06F 7/00 (2006.01)
G06F 17/00 (2006.01)

(52) U.S. Cl. .............................. 715/866; 707/E17.002; 707/E17.005; 707/E17.011; 707/E17.058; 707/2; 707/101

(58) Field of Classification Search ................. 715/866; 707/2

See application file for complete search history.

(56) References Cited

U.S. PATENT DOCUMENTS

| | | | | |
|---|---|---|---|---|
| 6,073,129 | A * | 6/2000 | Levine et al. ................... | 707/4 |
| 6,105,033 | A * | 8/2000 | Levine ........................ | 707/101 |
| 6,212,524 | B1 * | 4/2001 | Weissman et al. ........... | 707/101 |
| 6,389,414 | B1 * | 5/2002 | Delo et al. ..................... | 707/4 |
| 6,542,895 | B1 * | 4/2003 | DeKimpe et al. ........... | 707/101 |
| 6,718,032 | B1 * | 4/2004 | Vrenjak et al. .............. | 379/268 |
| 6,801,915 | B1 * | 10/2004 | Mack ......................... | 707/100 |
| 6,898,590 | B1 * | 5/2005 | Streifer ......................... | 707/2 |
| 7,188,124 | B2 * | 3/2007 | Huras et al. ................. | 707/202 |
| 7,257,603 | B2 * | 8/2007 | Murman et al. .......... | 707/104.1 |
| 7,287,034 | B2 * | 10/2007 | Wong et al. ................. | 707/101 |
| 7,461,076 | B1 * | 12/2008 | Weissman et al. .......... | 707/102 |
| 7,516,144 | B2 * | 4/2009 | Lakshminarasimhan .... | 707/101 |
| 2006/0100985 | A1 * | 5/2006 | Mark et al. .................... | 707/1 |
| 2006/0101048 | A1 * | 5/2006 | Mazzagatti et al. ......... | 707/101 |
| 2008/0092020 | A1 * | 4/2008 | Hasenplaugh et al. ....... | 714/781 |
| 2010/0023515 | A1 * | 1/2010 | Marx ............................ | 707/6 |

OTHER PUBLICATIONS

Eclipse EMF. Copyright Date : Jun. 29, 2004. http://www.eclipse.org/modeling/emf/docs/2.x/tutorials/clibmod/clibmod_emf2.0.html.*

* cited by examiner

*Primary Examiner*—Doug Hutton
*Assistant Examiner*—Soumya Dasgupta
(74) *Attorney, Agent, or Firm*—Holland & Knight LLP; Brian J. Colandreo, Esq.

(57) ABSTRACT

Methods and apparatus, including computer program products, for populating a table in a business application. A computer-implemented method of displaying information on a computer display device includes displaying a first view on the display device, the first view including dropdown values and data in a table of rows and columns, the data received from a table node data structure stored in a memory, the table node data structure including node elements and attributes, and generating a second view in response to a change in a dropdown value by repopulating the table of rows and columns using attribute identifications (IDs).

9 Claims, 5 Drawing Sheets

POPULATING A TABLE IN A BUSINESS APPLICATION

BACKGROUND

The present invention relates to data processing by a digital computer, and more particularly to populating a table in a business application.

Web Dynpro is an integral part of a SAP Web Application from SAP AG that provides a design-time environment that is independent of the underlying runtime environment and enables companies to model and design user interfaces (UIs) cost-effectively and precisely. A Web Dynpro application includes a set of views, navigation between the views, concepts for managing the views and determining their sequence, a context for keeping session data, and the business logic of the application. Web Dynpro incorporates a Model View Controller (MVC) paradigm that enables a strict separation of presentation logic, business logic, navigation, and eventing. In object-oriented programming development, MVC is the name of a methodology or design pattern for successfully and efficiently relating a UI to underlying data models. The MVC pattern is used in program development with programming languages such as Java, Smalltalk, C, and C++.

A UI Web Dynpro table includes a need for populating and re-populating data in the table. A UI Web Dynpro table receives its data from a table node data structure stored in a memory. The table node gets its data from model nodes. Populating the table node when data is extracted from multiple model nodes can be a lengthy, slow and performance-costly operation because data is extracted from model nodes using a looping process.

SUMMARY

The present invention provides methods and apparatus, including computer program products, for populating a table in a business application.

In general, in one aspect, the invention features a computer-implemented method of displaying information on a computer display device including displaying a first view on the display device, the first view including dropdown values and data in a table of rows and columns, the data received from a table node data structure stored in a memory, the table node data structure including node elements and attributes, and generating a second view in response to a change in a dropdown value by repopulating the table of rows and columns using attribute identifications (IDs).

In embodiments, the attributes can include calculated attributes and non-calculated attributes, the non-calculated attributes saving actual data contents and values of calculated attributes generated by calling a defined controller method.

The node elements can be model nodes and value nodes. The model nodes can include data provided by a back end system and the value nodes can include data for user interface (UI) elements.

In another aspect, the invention features a graphical user interface (GUI) for viewing items received from a database, the GUI including a first view including dropdown values and data in a table of rows and columns, the data received from a table node data structure stored in a memory, the table node data structure including node elements and attributes, and in response to a change in a dropdown value, a second view replacing the first view by repopulating the table of rows and columns using attribute identifications (IDs).

The invention can be implemented to realize one or more of the following advantages.

Methods speed up data population of a table using identifications (IDs); populating by ID using a combination of techniques reduces the populating process and its associated looping to minimum.

Using populating by IDs increases overall application process performance.

Populating by IDs is a technique that populates only the attribute IDs of a table node; all other attributes are calculated attributes that are populated "on the fly." This increases performance when a large amount of data has to be manipulated in a context and can reduce the number of back end system calls.

Populating a table node with attribute IDs is easy to implement and can result in performance savings when large amounts of data residing in different nodes are involved, such as a table associated with multiple dropdowns, whose selection changes drive re-populating.

Using populating by IDs results in a short response time and speeds up data comparison and data analysis.

One implementation of the invention provides all of the above advantages.

Other features and advantages of the invention are apparent from the following description, and from the claims.

DETAILED DESCRIPTION

Figure 1:
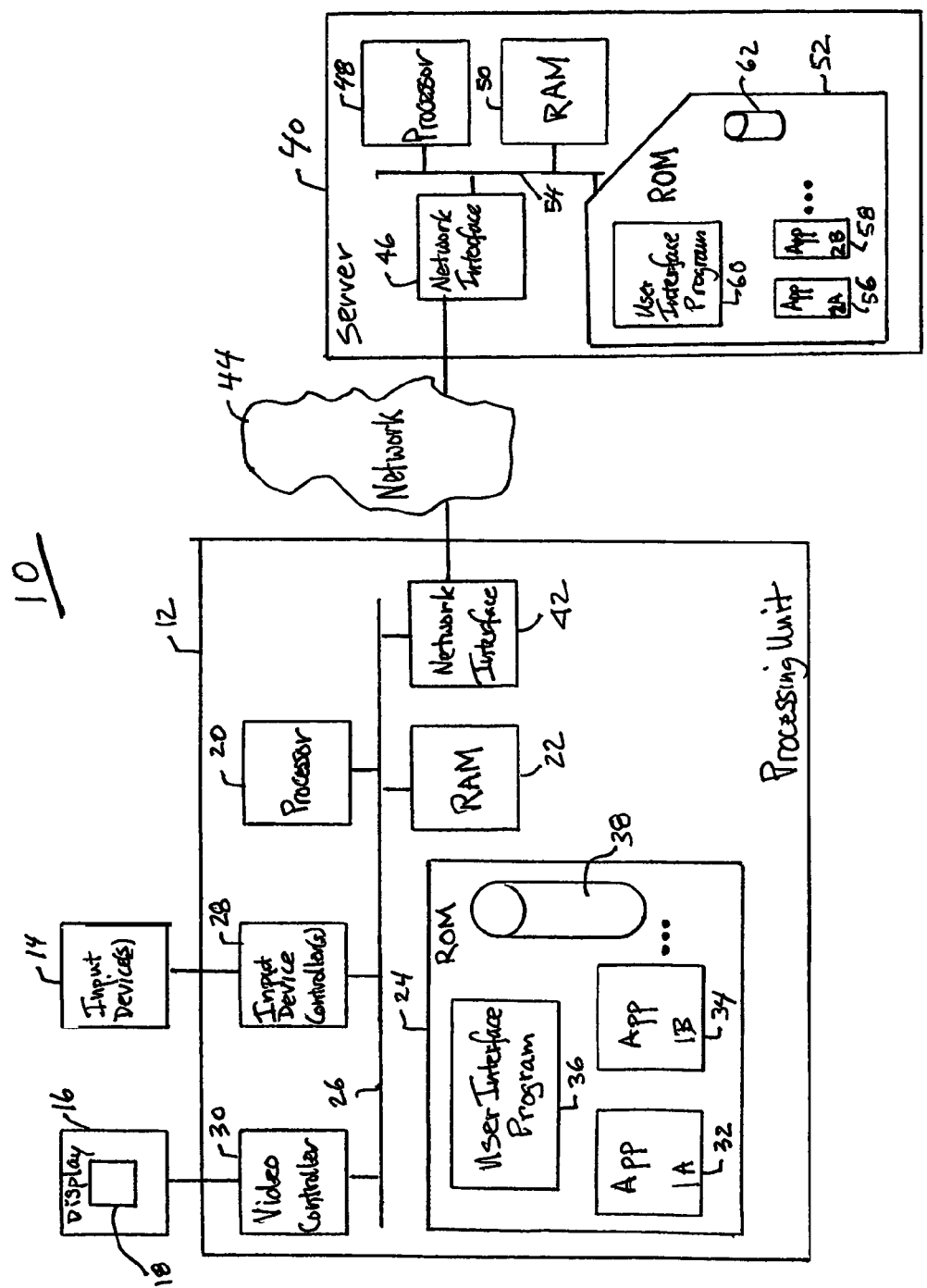
FIG. 1 is a block diagram of an exemplary system.

As shown in FIG. 1, an exemplary computer system 10 includes a processing unit 12, one or more input devices 14, and a display device 16, upon which a user is presented displays. The display device 16 has a video screen 18 upon which displays appear.

The processing unit 12 can include a processor 20, random access memory (RAM) 22, and read-only memory (ROM) 24, interconnected by a data bus 26. Input device controllers 28, also connected to the data bus 26, receive command signals from input devices 14 and forward the command signals in an appropriate format for processing. A video controller 30, connected to the data bus 26, receives video command signals from the data bus 26 and generates the appropriate video signals that are forwarded to the display device 16 so that the desired display is provided on the screen 18.

ROM 24 provides non-volatile data storage for various application programs. In the example shown, a number of different application programs 32, 34, are stored in ROM 24. Also stored in ROM 24 is a user interface (UI) program 36 designed to work in concert with each of the application programs 32, 34.

Programs 32, 34, 36 have program instructions that can be loaded into RAM 22 during operation. Processor 20 then executes the program instructions, as required, to perform desired program functions.

Also stored in ROM 24 are various data in database 38. Database 38 includes data needed or generated during operation of the application programs 32, 34. Although only a single database 38 is shown that serves as a common database for applications 32, 34, in other examples there can be separate databases for one, or more, of the applications 32, 34.

System 10 includes connection to a server 40 and a network interface 42, connected to its data bus 26. As such, system 10 can access server 40 over network 44 to run applications residing on the server 40. Network 44 can be, for example, a Local Area Network (LAN), a Wide Area Network (WAN), or the Internet.

The server 40 includes a network interface 46, a processor 48, RAM 50, and ROM 52, interconnected by a data bus 54. The network interface 46 provides the connection to network 44 so that client computer systems, such as system 10, can access the server 40. In similar fashion to computer system 10, ROM 52 includes various application programs 56, 58, as well as a UI program 60 for the application programs 56, 58. ROM 52, in this example, includes data stored in database 62, although in other implementations, separate databases or a separate database server may be required.

As an example, a table displayed on a UI is described using Web Dynpro from SAP AG. However, the methods described herein can be used in other UIs generated by other application programs. A UI Web Dynpro table element enables a two-dimensional display of data in cells arranged into rows and columns. The UI Web Dynpro table receives its data from a multiple context node having a collection of nodes and attributes. At runtime, each node element of the node collection is a table row. The number of table rows is identical to the number of node elements. The table columns correspond to context attributes.

A context is designed as a structured storage place for a Model View Controller (MVC). The MVC design pattern contains a clear distinction between processing control, data model and displaying the data in the interface. These three areas are formally distinguished from each other by three objects: model, view and controller.

The model is used as an application object of the application data administration. It responds to information requests about its status, which usually come from the view, as well as to statements for status changes, which are usually sent by the controller. In this way, only the model is used to process data internally, without making reference to the application and its user interface. There can be different views for a model, which can be implemented using different view pages.

The view handles the graphical and textual output at the interface and therefore represents the input and output data in each interface element, such as pushbuttons, menus, dialog boxes and so forth. The view takes on visualization. To visualize the status, the view queries the model, or the model informs the view about possible status changes.

The controller interprets and monitors the data that is input by the user using the mouse and the keyboard, causing the model or the view later to change if necessary. Input data is forwarded and changes to the model data are initiated. The controller uses the model methods to change the internal status and then informs the view about this. This is how the controller determines reactions to the user input and controls processing.

The view and the controller together form the user interface.

A context has nodes and attributes. Attributes are leafs in a tree data structure, residing in memory, meaning that attributes do not have any children.

A node represents collections of node elements. One element contains a set of attribute values for the attributes of this node. There are two types of nodes, i.e., model nodes and value nodes. A model node contains data provided by a back end system. The back end system is typically a server that usually does not have direct connections to the outside world, external processes, users, participants, and so forth. A primary "customer" of the back end system's services is typically another server, which in turn may be another back end system or a front end system.

A value node can contain data for UI elements. For example, a value code can be used for showing data in a UI Web Dynpro table. In this particular example, the attributes of the node are the columns of the table and the elements are the rows of the table.

Usually, context attributes are non-calculated attributes, i.e., the actual data contents are saved. If an attribute is calculated, then the value of the context attribute is not saved in the node elements. Instead, the value is calculated as required by calling a defined controller method. A calculated attribute has its value calculated dynamically at run time. A calculated attribute has set and get value methods associated with it.

As described above, when populating and re-populating a table with data from multiple nodes, a table receives its data from a table node data structure stored in memory. A table node gets its data from model nodes. Populating a table node with data from multiple model nodes can be a very lengthy process. An example can illustrate this problem.

Figures 2, 3:
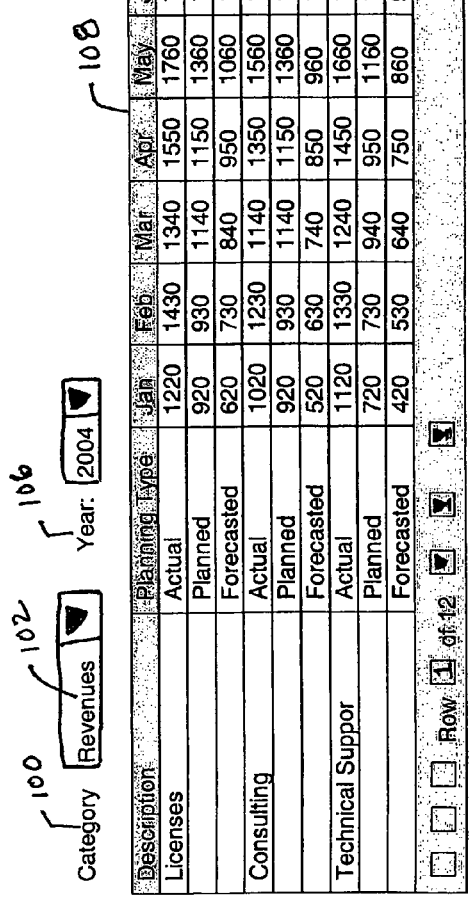
FIG. 2 is a block diagram of an exemplary table.
FIG. 3 is a block diagram of an exemplary table.

As shown in FIG. 2, here an end user wants to view either the monthly revenues or the monthly expenses for a given year, using one table and two dropdowns. One dropdown is for the categories 100 that are either revenues 102 or expenses 104, while the other dropdown is for years 106. A table 108 shows data for the revenues 102 for year 2004.

The table 108 includes twelve rows and fourteen columns. The last twelve columns in table 108 show the revenues per month, the first columns show the type of revenue. The second column is for the type of evaluation, i.e., forecasted, planned and actual.

As shown in FIG. 3, a table 110 includes the drop down of expenses 104 and its associated data. Table 110 has nine rows.

Figure 4:
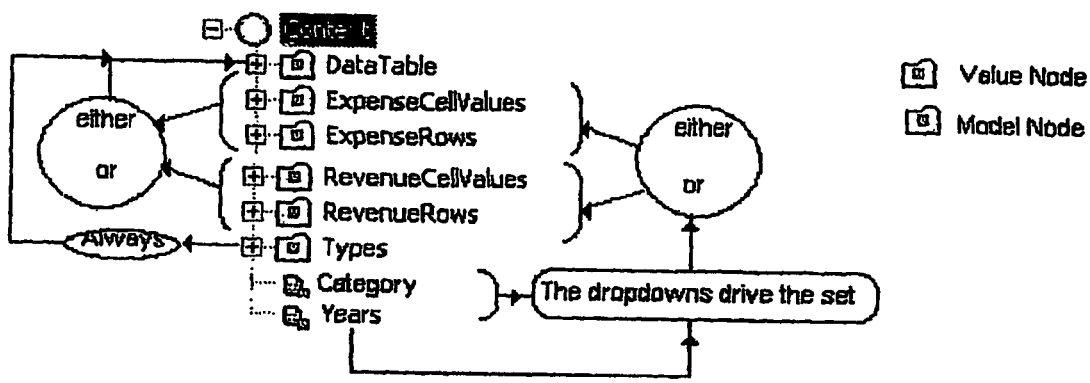
FIG. 4 is a block diagram of an exemplary table.

If a user changes either the category 100 or the year 106 using the dropdowns, the resulting table is re-populated. As shown in FIG. 4, if the user changes the categories dropdown, the table node, here referred to as "data table," is filled with data from either revenue model nodes or expense model nodes.

The dropdowns drive the set of nodes filling the table node for re-populating. In this particular example, a first set is an "ExpenseCellValues" node, an "ExpenseRows" node and Type nodes, a second set is a "RevenueCellValues" node, a "RevenueRows" node and the Type node.

When the table displays revenues the table node is populated with the two revenues nodes. The first node, RevenueRow node, contains an identification (ID) and name of the revenues, such as "Licenses," "Consulting" and "Technical Support." The second node, RevenueCellValues node, contains the monthly values of each source of revenues by planning type.

In addition to these nodes, the table node uses another model node, the "Types" node. The third node, "Types" node, contains an identification (ID) and name of the planning type, such as "Forecasted," "Planned" and "Actual."

Figure 5:
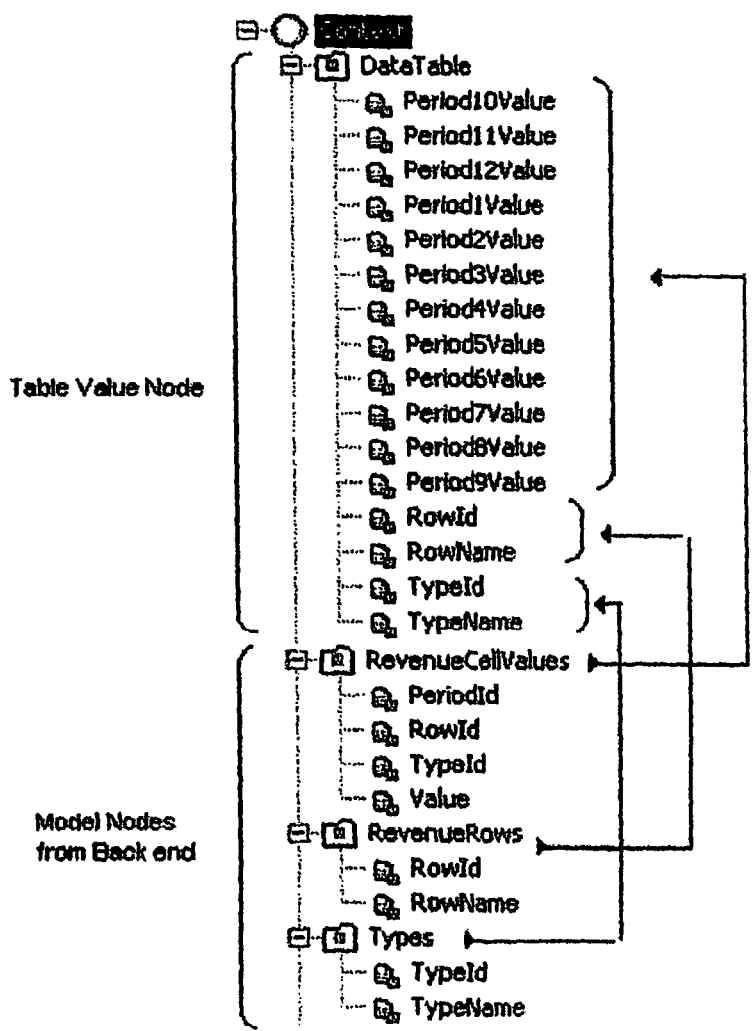
FIG. 5 is a block diagram of an exemplary table.

If the user chooses year from the year drop down, the table node is populated for the corresponding year, from either the RevenueCellValues node or the ExpenseCellValues node. FIG. 5 illustrates an exemplary population of the table node for "Revenues."

Here, the table value node includes the following attributes:

a. RowID and RowName: values are provided by the model node RevenuesRow.

b. TypeID and TypeName: values are provided by the model node types.
c. PeriodxxValues: the value of each period is provided by the mode node RevenueCellValues.

Each element of the RevenueCellValues has a period ID. The period ID has a format RevenueID+TypeID+YYYYMM.

In the past, a table node element was populated by looping through all the model nodes and finding the correct elements. This was a lengthy, slow and costly process. For example, using Revenues as an example, the re-population process would include:

First, loop through the RevenuesRows model node elements. For each RevenuesRows element, find its RowID and RowName.

Second, loop through the type node elements. Generate a data table node element, for each TypeName value, each element has the RowName found above. Put TypeID and TypeName in this element also.

Third, for each RowID+TypeID+PeriodID, loop in the RevenueCellValues node element and find the corresponding value, then populate the table node attribute "PeriodxxValue."

The revenues table has twelve rows, three types and three years of twelve months. Thus, the number of loops required for displaying a table with the revenues for three years is 12×3×3×12=1,296 loops.

We have designed a table population process to speed up table population/repopulation. Our method populates a table node by IDs. Populating by ID reduces the looping of traditional table population methods. Populating by IDs refers to re-populating a table node with only attribute IDs. These attribute IDs are sufficient to help retrieve the other data for each of the attributes.

Figure 6:
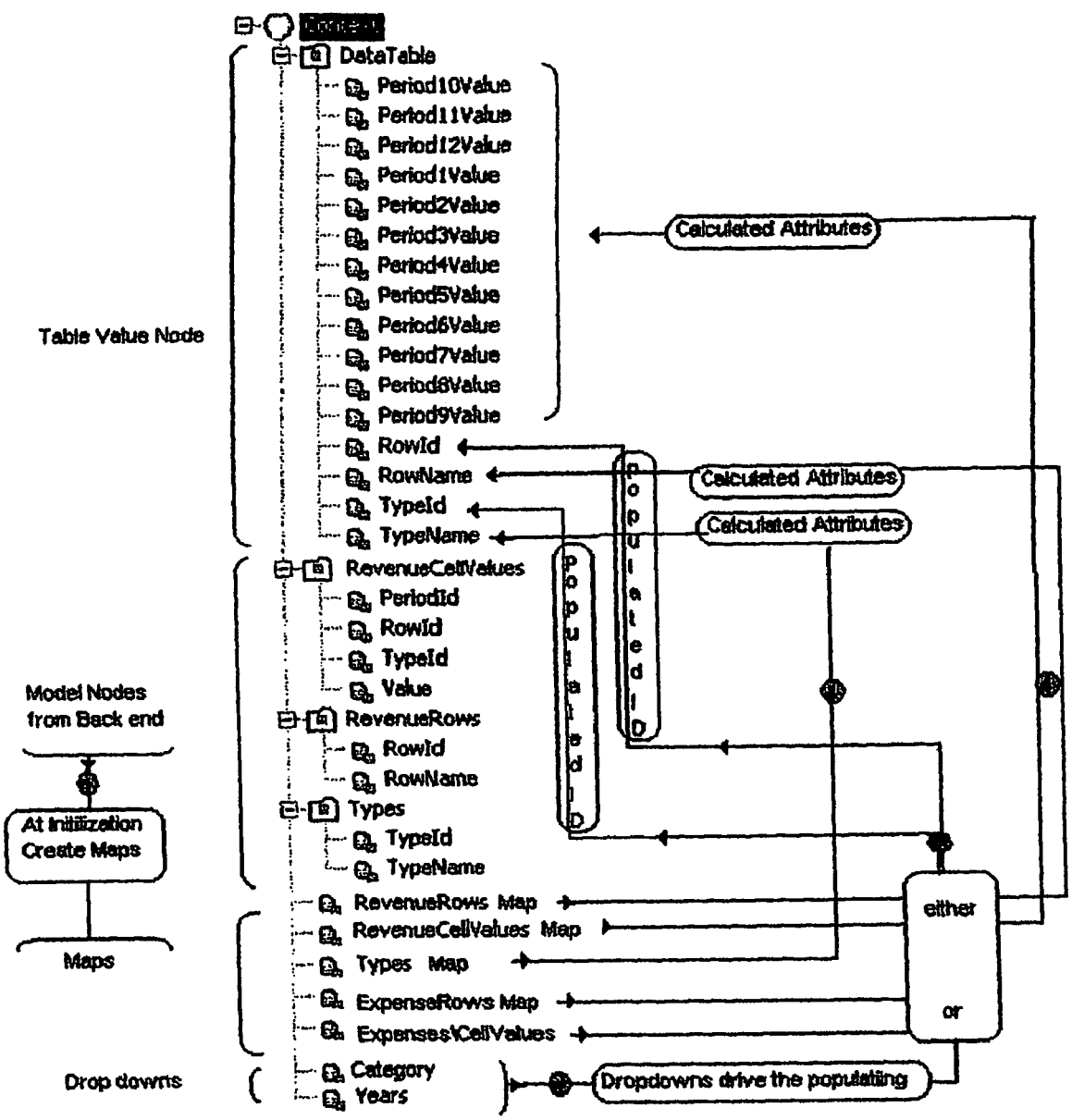
FIG. 6 is a block diagram.

As shown in FIG. 6, using the example described above, the table node includes only a RowID and TypeID. Our table population/re-population process focuses on two attributes instead of all (sixteen) attributes. The remaining non-ID attributes can be populated dynamically by making them calculated attributes. As described above, a calculated attribute has its value calculated as required by calling a defined controller method. In our example, the fourteen other attributes can be calculated in real time using calculated attribute methods, e.g., getter and setter methods in Java®. A getter method is a method that "gets" the value of a variable, while a setter method is a method that "sets" the value of a variable. We do not need to populate a period ID because the period ID is implicitly known. PeriodID has the format RowID+TypeID and YYYYMM. We have RowID and TypeID already, the year dropdown gives the year YYYY and the name of each attribute PeriodxxValue gives the xx value that is the month, i.e., xx=MM.

This table population/re-population process can also be used with node indexing (e.g., keys), also referred to as maps, which allow an immediate retrieval to the correct data without looping. In our example, we have five model nodes, i.e., RevenueRows, RevenueCellValues, Expenses, ExpenseCellValues and Type. This gives us five maps. These maps are generated once at initialization and used throughout, avoiding looping through the model nodes.

Figure 7:
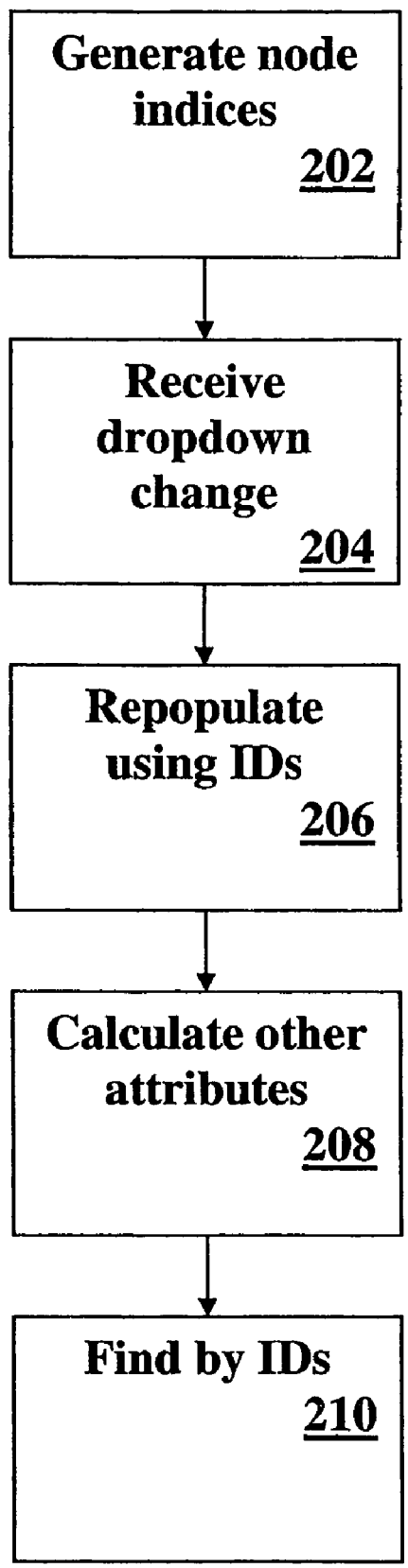
FIG. 7 is a flow diagram.
Like reference numbers and designations in the various drawings indicate like elements.

As shown in FIG. 7, a re-populating process 200 is illustrated. At an initialization the maps, i.e., node indices, are generated (202). When the dropdown values are changed (204), the maps are used to re-populate (206) only the two ID's attributes. All other attributes are calculated (208) using getter/setter methods. These getter/setter methods use the maps to find (210) by IDs the correct values associated with the corresponding IDs. Looping occurs at the initialization to create the maps and the loops are simple and fast because each loop is not a multi-node looping. It is only for one node at a time. In our example, the number of loops is now reduced to five instead of 1,296.

Embodiments of the invention can be implemented in digital electronic circuitry, or in computer hardware, firmware, software, or in combinations of them. Embodiments of the invention can be implemented as a computer program product, i.e., a computer program tangibly embodied in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A computer-implemented method of displaying information in a table on a computer display device, the method configured to reduce the number of operations required to populate the table, the method comprising:

displaying a front end view on the display device, the front end view comprising dropdown values and a plurality of data in a table of rows and columns, the data received from a back end node data structure stored in a memory, the back end node data structure comprising:

one or more table node elements configured to contain data for display in the front end view, the one or more table node elements including one or more identification attributes and one or more non-identification attributes; and one or more data node elements configured to contain data, each data node element including a method that computes a data node identifier configured to identify the row and column of the table where the data in the data node element is displayed;

receiving a request to repopulate the table;

in response to the request to repopulate the table, creating a repopulated table via:

calling the method that computes the data node identifier for each data node element in the back end node data structure;

populating the one or more non-identification attributes in the back end node data structure with data from the one or more data node elements in the back end node data structure having data node identifiers that match the identification attributes;

repopulating the plurality of data in the table of rows and columns in the front end view with the data in the one or more populated non-identification attributes; and displaying the repopulated plurality of data in the front end view.

2. The computer-implemented method of displaying information in the table on a computer display device of claim 1 wherein the non-identification attributes save actual data contents.

3. The method of claim 1 further comprising reducing the number of operations required to repopulate the table via populating the one or more non-identification attributes in the back end node data structure with the one or more data elements in the back end node data structure having data node identifiers that match the non-identification attributes.

4. A computer program product, tangibly embodied in a machine readable storage device, for providing display information in a table on a display device of a computer system, the computer program product configured to reduce the number of operations required to populate the table, the computer program product being operable to cause data processing apparatus to:

display a front end view on the display device, the front end view comprising dropdown values and a plurality of data in a table of rows and columns, the data received from a back end node data structure stored in a memory, the back end node data structure comprising:

one or more table node elements configured to contain data for display in the front end view, the one or more table node elements including one or more identification attributes and one or more non-identification attributes; and one or more data node elements configured to contain data, each data node element including a method that computes a data node identifier configured to identify the row and column of the table where the data in the data node element is displayed;

receive a request to repopulate the table;

in response to the request to repopulate the table, create a repopulated table via:

calling the method that computes the data node identifier for each data node element in the back end node data structure;

populating the one or more non-identification attributes in the back end node data structure with data from the one or more data node elements in the back end node data structure having data node identifiers that match the identification attributes;

repopulating the plurality of data in the table of rows and columns in the front end view with the data in the one or more populated non-identification attributes; and displaying the repopulated plurality of data in the front end view.

5. The computer program product of claim 4 wherein the non-identification attributes save actual data contents.

6. The computer program product of claim 4, the computer program product being further operable to cause the data processing apparatus to reduce the number of operations required to repopulate the table via populating the one or more non-identification attributes in the back end node data structure with the one or more data elements in the back end node data structure having data node identifiers that match the non-identification attributes.

7. A computer system configured to reduce the number of operations required to populate a table comprising:

a display device;

a processing unit; and a memory having a plurality of instructions stored thereon, which, when executed by the processing unit, cause the central processing unit to:

display a front end view on the display device, the front end view comprising dropdown values and a plurality of data in a table of rows and columns, the data received from a back end node data structure stored in a memory, the back end table node data structure comprising:

one or more table node elements configured to contain data for display in the front end view, the plurality of table node elements including one or more identification attributes and one or more non-identification attributes; and one or more data node elements configured to contain data, each data node element including a method that computes a data node identifier configured to identify the row and column of the table where the data in the data node element is displayed;

receive a request to repopulate the table;

in response to the request to repopulate the table, create a repopulated table via:

calling the method that computes the data node identifier for each data node element in the back end node data structure;

populating the one or more non-identification attributes in the back end node data structure with data from the one or more data node elements in the back end node data structure having data node identifiers that match the identification attributes;

repopulating the plurality of data in the table of rows and columns in the front end view with the data in the one or more populated non-identification attributes; and displaying the repopulated plurality of data in the front end view.

8. The computer system of claim 7 wherein the non-identification attributes save actual data contents.

9. The system of claim 7 wherein the instructions further cause the central processing unit to reduce the number of operations required to repopulate the table via populating the one or more non-identification attributes in the back end node data structure with the one or more data elements in the back end node data structure having data node identifiers that match the non-identification attributes.

* * * * *